(12) United States Patent
Chung

(10) Patent No.: US 9,329,777 B2
(45) Date of Patent: May 3, 2016

(54) METHOD AND SYSTEM FOR PROVIDING BACKGROUND CONTENTS OF VIRTUAL KEY INPUT DEVICE

(75) Inventor: Hee Sung Chung, Seoul (KR)

(73) Assignee: NEOPAD, INC., Seoul (KR)

( * ) Notice: Subject to any disclaimer, the term of this patent is extended or adjusted under 35 U.S.C. 154(b) by 86 days.

(21) Appl. No.: 13/386,393

(22) PCT Filed: Sep. 29, 2011

(86) PCT No.: PCT/KR2011/007197
§ 371 (c)(1),
(2), (4) Date: Jan. 20, 2012

(87) PCT Pub. No.: WO2012/050314
PCT Pub. Date: Apr. 19, 2012

(65) Prior Publication Data
US 2012/0274658 A1 Nov. 1, 2012

(30) Foreign Application Priority Data
Oct. 14, 2010 (KR) .......................... 10-2010-0100101

(51) Int. Cl.
*G09G 5/00* (2006.01)
*G06F 3/0488* (2013.01)

(52) U.S. Cl.
CPC .................................. *G06F 3/04886* (2013.01)

(58) Field of Classification Search
CPC ... G06F 3/04886; G06F 3/04883; G09G 5/14; G09G 2340/10; G09G 2340/125; G06T 11/60; G06T 15/503
See application file for complete search history.

(56) References Cited

U.S. PATENT DOCUMENTS

| | | | | |
|---|---|---|---|---|
| 4,202,041 A | * | 5/1980 | Kaplow | G06F 3/0238 341/26 |
| 5,581,243 A | * | 12/1996 | Ouellette et al. | 345/173 |
| 5,638,501 A | * | 6/1997 | Gough et al. | 345/639 |
| 5,936,614 A | * | 8/1999 | An et al. | 345/173 |
| 6,121,960 A | * | 9/2000 | Carroll et al. | 345/173 |
| 6,130,665 A | * | 10/2000 | Ericsson | 345/173 |

(Continued)

FOREIGN PATENT DOCUMENTS

| | | | |
|---|---|---|---|
| CN | 101772945 A | 7/2010 | |
| EP | 1359522 A1 * | 11/2003 | ............ G06F 17/60 |
| JP | 2006-244204 A | 9/2006 | |
| JP | 2009-55325 A | 3/2009 | |
| KR | 10-2003-0073957 A | 9/2003 | |
| KR | 10-2007-0052583 A | 5/2007 | |
| KR | 10-2007-0115548 A | 12/2007 | |

(Continued)

OTHER PUBLICATIONS

Harkins, 10+ reasons to split an Access database, 2009.*

(Continued)

*Primary Examiner* — Phi Hoang
*Assistant Examiner* — Charles L Beard
(74) *Attorney, Agent, or Firm* — Sughrue Mion, PLLC

(57) ABSTRACT

A method for providing a background image to a virtual key input device for display on an information communication terminal thereof supporting a touch user interface (TUI). The method includes receiving, via the information communication terminal, a selection of settings by a user for a virtual key input unit, generating the virtual key input unit using the selected settings, the virtual key input unit being transparent, receiving, via the information communication terminal, a selection of background contents by the user for the virtual key input unit, and generating a background skin based on the selected background contents, and combining the transparent virtual key input unit and the background skin.

15 Claims, 17 Drawing Sheets

(56) References Cited

U.S. PATENT DOCUMENTS

| | | | |
|---|---|---|---|
| 6,307,541 B1* | 10/2001 | Ho et al. | 345/171 |
| 6,611,253 B1* | 8/2003 | Cohen | 345/168 |
| 6,677,933 B1* | 1/2004 | Yogaratnam | 345/174 |
| 6,731,310 B2* | 5/2004 | Craycroft et al. | 715/765 |
| 7,062,655 B2* | 6/2006 | Nelson | G06F 21/46 713/182 |
| 7,168,046 B2* | 1/2007 | Kang et al. | 715/773 |
| 7,356,570 B1* | 4/2008 | Tuli | G06F 17/30905 709/217 |
| 7,487,461 B2* | 2/2009 | Zhai | G06F 3/04883 345/168 |
| 7,515,135 B2* | 4/2009 | Varanda | 345/156 |
| 7,721,222 B1* | 5/2010 | Shaik | 715/773 |
| 7,853,875 B2* | 12/2010 | Cohen | G06F 9/4443 715/273 |
| 8,015,232 B2* | 9/2011 | Vigil et al. | 709/200 |
| 8,059,100 B2 | 11/2011 | Kim et al. | |
| 8,212,768 B2* | 7/2012 | Fein | G06F 3/0304 345/156 |
| 8,300,023 B2* | 10/2012 | Forutanpour | G06F 3/0216 178/18.01 |
| 8,327,296 B2* | 12/2012 | Arscott et al. | 715/863 |
| 8,345,008 B2* | 1/2013 | Lee et al. | 345/168 |
| 8,381,119 B2* | 2/2013 | Yeh | G06F 3/018 345/168 |
| 8,463,253 B2* | 6/2013 | Chipalkatti et al. | 455/418 |
| 8,484,480 B2* | 7/2013 | Cheng et al. | 713/182 |
| 8,497,841 B1* | 7/2013 | Sze et al. | 345/168 |
| 8,581,850 B2* | 11/2013 | Fyke | G06F 3/016 345/169 |
| 8,593,406 B2* | 11/2013 | Longe | G06F 3/0238 345/168 |
| 8,694,885 B2* | 4/2014 | Huang | G06F 3/04895 715/705 |
| 8,719,723 B2* | 5/2014 | Rath et al. | 715/773 |
| 2001/0048411 A1* | 12/2001 | Taguchi | 345/87 |
| 2002/0032546 A1* | 3/2002 | Imamura et al. | 703/1 |
| 2002/0149569 A1* | 10/2002 | Dutta et al. | 345/173 |
| 2002/0171633 A1* | 11/2002 | Brinjes | 345/168 |
| 2002/0188872 A1* | 12/2002 | Willeby | 713/202 |
| 2003/0004983 A1* | 1/2003 | Cohen | 707/500 |
| 2003/0197687 A1* | 10/2003 | Shetter | 345/173 |
| 2004/0046744 A1* | 3/2004 | Rafii et al. | 345/168 |
| 2004/0064364 A1* | 4/2004 | Toyooka | 705/14 |
| 2004/0119751 A1* | 6/2004 | Yoshimi et al. | 345/173 |
| 2004/0125147 A1* | 7/2004 | Liu et al. | 345/773 |
| 2004/0183834 A1* | 9/2004 | Chermesino | 345/773 |
| 2004/0212595 A1* | 10/2004 | Zhou | 345/168 |
| 2004/0230912 A1* | 11/2004 | Clow et al. | 715/773 |
| 2005/0012723 A1* | 1/2005 | Pallakoff | 345/173 |
| 2005/0248525 A1* | 11/2005 | Asai | 345/156 |
| 2005/0275633 A1* | 12/2005 | Varanda | 345/173 |
| 2005/0286806 A1* | 12/2005 | Kayahara | 382/305 |
| 2006/0050142 A1* | 3/2006 | Scott et al. | 348/14.05 |
| 2006/0176317 A1* | 8/2006 | Tamaki et al. | 345/629 |
| 2006/0287920 A1* | 12/2006 | Perkins et al. | 705/14 |
| 2007/0019261 A1* | 1/2007 | Chu | 358/540 |
| 2007/0089164 A1* | 4/2007 | Gao et al. | 726/4 |
| 2007/0109276 A1* | 5/2007 | Kim et al. | 345/173 |
| 2007/0200827 A1* | 8/2007 | Samal | 345/168 |
| 2007/0300175 A1* | 12/2007 | Lu | 715/773 |
| 2008/0012880 A1* | 1/2008 | Plut | 345/660 |
| 2008/0032749 A1* | 2/2008 | Baek et al. | 455/566 |
| 2008/0072167 A1* | 3/2008 | Choi et al. | 715/764 |
| 2008/0117171 A1* | 5/2008 | Kwak | 345/168 |
| 2008/0180654 A1* | 7/2008 | Bathiche et al. | 356/51 |
| 2008/0303796 A1* | 12/2008 | Fyke | 345/173 |
| 2008/0316180 A1* | 12/2008 | Carmody et al. | 345/172 |
| 2008/0320410 A1* | 12/2008 | Whytock et al. | 715/773 |
| 2009/0027346 A1* | 1/2009 | Srivastava et al. | 345/169 |
| 2009/0070098 A1* | 3/2009 | Patryshev | 704/3 |
| 2009/0183098 A1* | 7/2009 | Casparian et al. | 715/765 |
| 2009/0187851 A1* | 7/2009 | Liu | 715/788 |
| 2009/0225035 A1* | 9/2009 | Baik | 345/173 |
| 2009/0237361 A1* | 9/2009 | Mosby et al. | 345/173 |
| 2009/0270078 A1* | 10/2009 | Nam | G06F 3/0238 455/414.1 |
| 2009/0287769 A1* | 11/2009 | Kanda | 709/203 |
| 2009/0298546 A1* | 12/2009 | Kim et al. | 455/566 |
| 2009/0303200 A1* | 12/2009 | Grad | 345/173 |
| 2010/0020036 A1* | 1/2010 | Hui et al. | 345/173 |
| 2010/0060585 A1* | 3/2010 | Chiu | 345/168 |
| 2010/0061054 A1* | 3/2010 | Ladouceur et al. | 361/679.56 |
| 2010/0081476 A1* | 4/2010 | Markiewicz et al. | 455/566 |
| 2010/0088625 A1* | 4/2010 | Chen | 715/773 |
| 2010/0088647 A1* | 4/2010 | Jing et al. | 715/838 |
| 2010/0097321 A1* | 4/2010 | Son et al. | 345/169 |
| 2010/0131924 A1* | 5/2010 | Tsai | 717/110 |
| 2010/0156798 A1* | 6/2010 | Archer | 345/169 |
| 2010/0164882 A1* | 7/2010 | Fu | 345/173 |
| 2010/0177035 A1* | 7/2010 | Schowengerdt et al. | 345/156 |
| 2010/0177048 A1* | 7/2010 | Semenets | G06F 3/0233 345/173 |
| 2010/0241985 A1* | 9/2010 | Kim et al. | 715/773 |
| 2010/0257469 A1* | 10/2010 | Kim et al. | 715/763 |
| 2010/0259561 A1* | 10/2010 | Forutanpour | G06F 3/0216 345/660 |
| 2010/0259895 A1* | 10/2010 | Cupps et al. | 361/695 |
| 2010/0275126 A1* | 10/2010 | Lincke | 715/738 |
| 2010/0302511 A1* | 12/2010 | Kang et al. | 353/31 |
| 2010/0323762 A1* | 12/2010 | Sindhu | 455/566 |
| 2011/0074692 A1* | 3/2011 | Causey | G06F 3/0216 345/169 |
| 2011/0090151 A1* | 4/2011 | Huang et al. | 345/168 |
| 2011/0095994 A1* | 4/2011 | Birnbaum | 345/173 |
| 2011/0102462 A1* | 5/2011 | Birnbaum | 345/647 |
| 2011/0141027 A1* | 6/2011 | Ghassabian | 345/168 |
| 2011/0171617 A1* | 7/2011 | Yeh | G06F 3/04886 434/157 |
| 2011/0179355 A1* | 7/2011 | Karlsson | 715/702 |
| 2011/0199312 A1* | 8/2011 | Okuta | 345/173 |
| 2011/0221682 A1* | 9/2011 | Gao | 345/169 |
| 2011/0254776 A1* | 10/2011 | Elizarov et al. | 345/173 |
| 2011/0261058 A1* | 10/2011 | Luo | 345/441 |
| 2011/0285656 A1* | 11/2011 | Yaksick et al. | 345/173 |
| 2011/0300912 A1* | 12/2011 | Kim et al. | 455/566 |
| 2011/0313972 A1* | 12/2011 | Albouze | 707/624 |
| 2012/0011445 A1* | 1/2012 | Gilboa | 715/740 |
| 2012/0019446 A1* | 1/2012 | Wu | G06F 3/018 345/168 |
| 2012/0019466 A1* | 1/2012 | Baik | 345/173 |
| 2012/0054320 A1* | 3/2012 | Yoshida | G06F 3/04886 709/219 |
| 2012/0068937 A1* | 3/2012 | Backlund et al. | 345/173 |
| 2012/0157165 A1* | 6/2012 | Kim et al. | 455/566 |
| 2012/0290287 A1* | 11/2012 | Fux et al. | 704/8 |
| 2013/0002562 A1* | 1/2013 | Leskela et al. | 345/169 |
| 2013/0063357 A1* | 3/2013 | Lee | G06F 3/04886 345/168 |
| 2013/0257732 A1* | 10/2013 | Duffield | 345/168 |
| 2014/0047374 A1* | 2/2014 | He | G06F 3/048 715/773 |

FOREIGN PATENT DOCUMENTS

| KR | 10-0818043 B1 | 3/2008 |
|---|---|---|
| KR | 10-0897177 B1 | 5/2009 |

OTHER PUBLICATIONS

English Language Abstract of KR10-2003-0073957 A.
English Language Abstract of KR10-2007-0052583 A.
English Language Abstract of KR10-2007-0115548 A.
International Search Report of PCT/KR2011/007197 mailed on May 30, 2012.
Chinese Office Action for corresponding Application No. 201180003394.0 issued Jun. 24, 2014.
Japanese Office Action for corresponding Application No. 2013-533760 issued Apr. 14, 2015.

* cited by examiner

| No | NAME | DATE | PROVIDER | RESOLUTION | SIZE | USE | CUT NUMBER |
|---|---|---|---|---|---|---|---|
| PHOTOGRAPH 1 | PUPPY | 201X.11.2 | KIM XX | 480X800 | 2"X4" | PERSONAL | 1 |
| PICTURE 1 | MOUNTAIN | 201X.1.1 | HONG XX | 480X320 | 3"X3" | GROUP | 1 |
| VIDEO 1 | CAT | ... | Neopad | 1020X820 | 4"X4" | ADVERTISEMENT | 200 |
| . | . | . | . | . | . | . | . |
| . | . | . | . | . | . | . | . |
| . | . | . | . | . | . | . | . |

# METHOD AND SYSTEM FOR PROVIDING BACKGROUND CONTENTS OF VIRTUAL KEY INPUT DEVICE

TECHNICAL FIELD

The present invention relates to a method and system for providing background contents of a virtual key input device, which enables a user to select, design, and create a background image of the virtual key input device on his/her information communication equipment by himself/herself, and enables a service provider to provide background contents based on user experience (UX).

BACKGROUND

Recent mobile information communication terminals such as smart phones and pad-type PCs support a touch user interface (TUI). The TUI displays various types of keypads (or keyboards) such as a Qwerty keyboard and a 12 keypad on a display screen. When a user touches a virtual keypad, the TUI recognizes the touched keypad as an input signal. Such a virtual key input device provides diversity of tools, and enables a user to freely select a device. Furthermore, terminals having the TUI mounted therein provide an intuitional user interface (UI). Therefore, although the terminals having the TUI mounted therein are relatively expensive, they have high product competitiveness.

In the conventional terminals supporting the TUI, however, although the virtual keypad occupies a considerably large area of the display screen, the background image of the keypad is provided as single-color buttons. That is, the virtual keypad occupying a considerably large display space is provided in software. However, the display space has not been utilized in a business way.

A typical mobile information communication terminal has a limited space which may be utilized for a business service. However, it is important for the recent business services to secure a space where an interactive service with a user may be performed. This is the latest technology field where UI technology aimed for realizing convenient writing and easy learning and UX technology aimed for satisfying writing pleasure and latent needs are merged.

Techniques for providing a background image include a technique related to 'skin'. Korean Patent Laid-open Application No. 2003-0073957 discloses an apparatus and method for controlling skin modification as the technique related to 'skin'. The apparatus for controlling skin modification is used in a mobile communication terminal including a display device capable of displaying characters or symbols corresponding to the characters and a select keypad for selection, and includes an internal memory having an internal memory address area and an external memory address area, an external memory configured to store various skin data, and a controller configured to read skin data from the external memory and set the read skin data when a skin is selected in case where the external memory is mounted.

However, the conventional technique and the techniques related thereto do not provide a business mode based on UX, and have nothing to do with a virtual keypad provided by a TUI. This is because it is only a short time since the information communication devices such as smart phones emerged, and the development of techniques related to UX has not come to maturity.

DISCLOSURE

Technical Problem

An embodiment of the present invention is directed to a method and system for providing background contents of a virtual key input device, which enables a user to freely select, design, and create a background image of a virtual character input keypad or keyboard of the user's information communication terminal such that the background image may be used as the user's own user interface or a business interface based on the user's emotion and necessity.

Another embodiment of the present invention is directed to a method and system for providing background contents of a virtual key input device, which utilizes a background image of a virtual keypad or keyboard as a space for posting various business contents, thereby providing a UX-based business model which interactively provides various services such as advertisement, E-learning, and PR to a user.

Technical Solution

According to an embodiment of the present invention, there is provided a method for providing background contents of a virtual key input device, which provides a background image to a virtual key input device on an information communication terminal supporting a UTI. The method includes: selecting a virtual key input unit in the information communication terminal; generating the selected virtual key input unit into a transparent skin input unit; selecting background contents of the virtual key input unit, and generating a background skin based on the selected background contents; and combining the transparent skin input unit and the background skin.

The selecting of the virtual key input unit may include: selecting a language of the virtual key input unit; selecting a key input method; and selecting a shape of the virtual key input unit.

The generating of the background skin based on the background contents of the virtual key input unit may include: searching background contents; posting the searched background contents; selecting background contents; and generating the background skin of the virtual key input unit based on the selected background contents, according to physical characteristics of the information communication terminal.

The generating of the background skin of the virtual key input unit based on the selected background contents may include: standardizing the background contents according to the size of the virtual key input unit; and adjusting the resolution of the background contents according to the resolution of the information communication terminal.

The combining of the transparent skin input unit and the background skin may include: loading the background skin into a virtual key input unit area of a display screen of the information communication terminal; and loading the transparent skin input unit of the virtual key input unit, and combining the loaded transparent skin input unit and the background skin.

The method may further include: constructing a personal background contents DB; and constructing a business background contents DB.

The constructing of the personal background contents DB may include: creating background contents using a media processor of the information communication terminal; and storing the created background contents in a DB.

The personal background contents may include photographs, pictures, or animations.

The constructing of the business background contents DB may include: producing background contents in the form of contents for the information communication terminal; and storing the produced background contents in a DB.

The business background contents may include advertisement, education, or PR contents which are represented as multimedia contents including photographs, pictures, or animations. Each of the personal background contents DB and the business background contents DB comprises attributes of contents for each record, and the attributes comprise a name, a production date, resolution, and a size of the contents.

The method may further include controlling, by a user, a use environment of the virtual key input unit of the user.

The controlling of the use environment of the virtual key input unit may include selecting whether to utilize the virtual key input unit for personal use or open the virtual key input unit for business use.

According to another embodiment of the present invention, there is provided a system for providing background contents of a virtual key input device, which provides a background image to a virtual key input device on an information communication terminal supporting a TUI. The system includes: a transparent skin input unit generator configured to generate a transparent skin input unit using a virtual key input unit displayed on the information communication terminal; a background skin generator configured to select background contents of the virtual key input unit and generate a background skin using the selected background contents; and a skin combiner configured to combine the transparent skin input unit and the background skin.

The transparent skin input unit generator may select a language, a key input method, and a shape of the virtual key input unit, and generate a transparent skin input unit using the selected virtual key input unit.

The background skin generator may standardize background contents according to the size of the virtual key input unit, and adjust the resolution of the background contents according to the resolution of the information communication terminal.

The skin combiner may load the background skin into a virtual key input unit area of a display screen of the information communication terminal, load the transparent skin input unit, and combine the transparent skin input unit and the background skin.

The system may further include a background control unit configured to select and provide personal background contents created by a user and business background contents provided by a service provider.

The system may further include: a personal background contents DB configured to store personal background contents; and a business background contents DB configured to store business background contents. The personal background contents DB and the business background contents DB may be separately constructed.

The personal background contents may include photographs, pictures, or animations.

The business background contents may include advertisement, education, or PR contents which are represented as multimedia contents including photographs, pictures, or animations.

Each of the personal background contents DB and the business background contents DB comprises attributes of contents for each record, and the attributes comprise a name, a production date, resolution, and a size of the contents.

Advantageous Effects

According to the embodiments of the present invention, the method and system for providing background contents of a virtual key input device provides various character input methods and shapes to a virtual keypad or keyboard which is touched most frequently when a user uses an information communication terminal, thereby providing a UI technique through which the user may utilize an optimal character input environment. Furthermore, the method and system may post various contents on the background screen of the virtual keypad or keyboard, thereby providing writing pleasure and enabling the user to experience the UX technology.

Furthermore, the method and system provides various business contents to the virtual key input device of the user, thereby expanding the range of business models for service providers. In addition, the service providers may offer an economic benefit to users who read advertisements. Therefore, the method and system may contribute to industrial development.

BEST MODE FOR THE INVENTION

Figure 1:
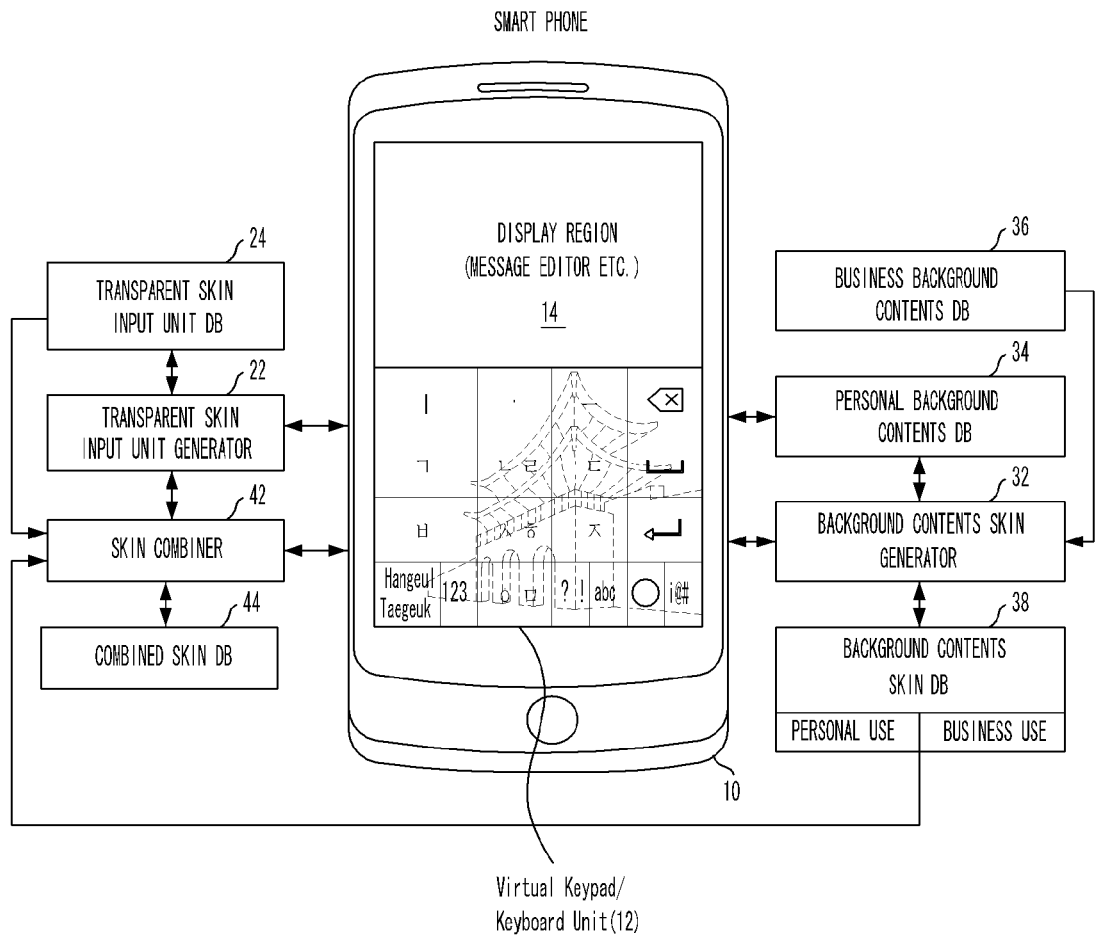
FIG. 1 is a block diagram of a system for providing background contents of a virtual key input device according to an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram of a system for providing background contents of a virtual key input device according to an embodiment of the present invention, illustrating a system architecture implemented by using a smart phone. FIG. 1 illustrates that a virtual key input device implemented in software and a photograph as a background image are combined and provided on a display screen of a smart phone 10 according to the embodiment of the present invention.

In the following descriptions, 'virtual key input unit' refers to a keypad or keyboard which is displayed in software by a TUI. For example, the keypad or keyboard includes a Qwerty keyboard, 12-number keypad or the like. In this embodiment of the present invention, the virtual key input unit is provided as a transparent skin. Hereinafter, this will be referred to as 'transparent skin input unit'. Furthermore, background contents are standardized to form a background skin which is to be displayed on an information communication terminal such as the smart phone 10, and the background skin is combined with the transparent skin input unit and then displayed on the smart phone 10. Hereinafter, a skin obtained by standardizing background contents according to the information communication terminal is referred to as 'background skin', and a skin obtained by combining a transparent skin input unit and a background skin is referred to as 'combined skin'.

Referring to FIG. 1, the system for providing background contents of a virtual key input device according to the embodiment of the present invention includes a transparent skin input unit generator 22, a background skin generator 32, and a skin combiner 42 for combining a transparent skin input unit and a background skin. Here, '~ generators' refer to components which play specific roles, and are implemented in graphic processing software on an external PC or information communication terminal. Meanwhile, '~ generator' may refer to a hardware component such as field-programmable gate array (FPGA) or application specific integrated circuit (ASIC). As such, '~ generator' is not limited to software or hardware. For example, '~ generator' may be constructed in a storage medium, and may be configured to drive one or more processors. For example, '~ generator' may include certain processes, functions, sub routines, segments of a program code, firmware, microcode, a database, and variables.

The transparent skin input unit generator 22 serves to generate character keys for inputting a specific language (for example, English or Korean) designated by a user and a two-dimensional (2D) figure having frame data of the character keys. When the language and standard of a virtual key input unit are decided by a user, the transparent skin input unit generator 22 generates the virtual key input unit as a transparent skin. The generated transparent skin input unit is stored in and managed by a transparent skin input unit DB 24. The transparent skin input unit DB 24 and '~DB' which will be described below may be implemented by using a typical database system, and may be implemented in the form of gallery photo files provided by the smart phone 10.

The background skin generator 32 serves to generate background contents in a skin form according to the size and shape of a virtual key input unit. The background skin generator 32 may also be implemented in graphic processing software in an external PC or information communication terminal. Here, the background contents are divided into personal background contents and business background contents.

The personal background contents may include personal background contents selected or created by a user or combinations thereof. The background contents are stored in and managed by a personal background contents DB 34 provided in the smart phone 10. The personal background contents DB 34 may be updated through a wireless local area network (WLAN) or 3G network or directly downloaded by a user. Furthermore, the personal background contents DB 34 may be constructed in a remote server system.

The business background contents may include business background contents provided by service providers and combinations thereof. A business background contents DB 36 is a DB system which stores and manages business background contents. For example, the DB system is constructed in a DB server provided in service providers for providing services such as advertisement, education, and public relations (PR).

The personal background contents include multimedia files such as photographs, picture files, and animations. The business background contents include multimedia files containing advertise contents, E-learning contents, and PR contents. The background skin generator 32 is configured to generate background contents according to a user's manipulation or service provider's remote control, and store the generated background contents in a background skin DB 38. Referring to FIG. 1, the background skin DB 38 stores the personal background contents and the business background contents in separate memory tables, respectively.

The skin combiner 42 is configured to combine a 2D-figure transparent skin input unit 23 generated by the transparent skin input unit generator 22 and a background skin 33 generated by the background skin generator 32, and form a combined skin 43. The transparent skin input unit 23 has only frame data of character keys. For example, the skin combiner 42 is implemented in graphic software in an external PC or information communication terminal, and the combined skin 43 formed by the skin combiner 42 is stored in and managed by a combined skin DB 44. Referring to FIG. 1, the smart phone 10 includes a lower region 12 for displaying the combined skin 43 and an upper region 14 for displaying an editor such as a message editor.

Graphic software used for the processing of the transparent skin input unit generator 22, the background skin generator 32, and the skin combiner 42 may include Photoshop, Flash, and other device APIs (for camera), for example.

Figure 2:
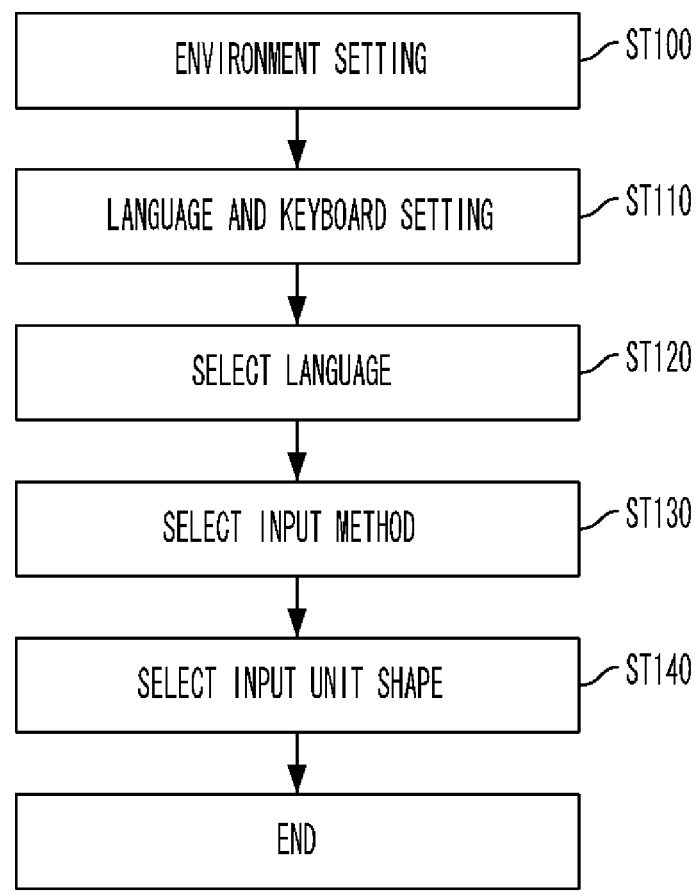
FIG. 2 shows a process for selecting a virtual key input unit.

FIG. 2 shows a process for selecting a virtual key input unit in an information communication terminal. In the smart phone 10, environment settings for character input are collectively managed by a menu referred to as 'Settings'. As a user executes 'Settings', the process is started at step ST100. Then, language and keyboard setting of the virtual key input unit (by a TUI) is performed in the environment setting mode, at step ST110. Here, the user selects a language of the virtual key input unit at step ST120, and selects an input method at step ST130.

The input method may include various input methods such as a full keyboard, a 12-key pad, and a hand-writing input system. The full keyboard may include a Qwerty keyboard, and the 12-key pad may include a telephone pad. When the input method is selected, the user selects the shape of the virtual key input unit at step 140.

Figure 3A:
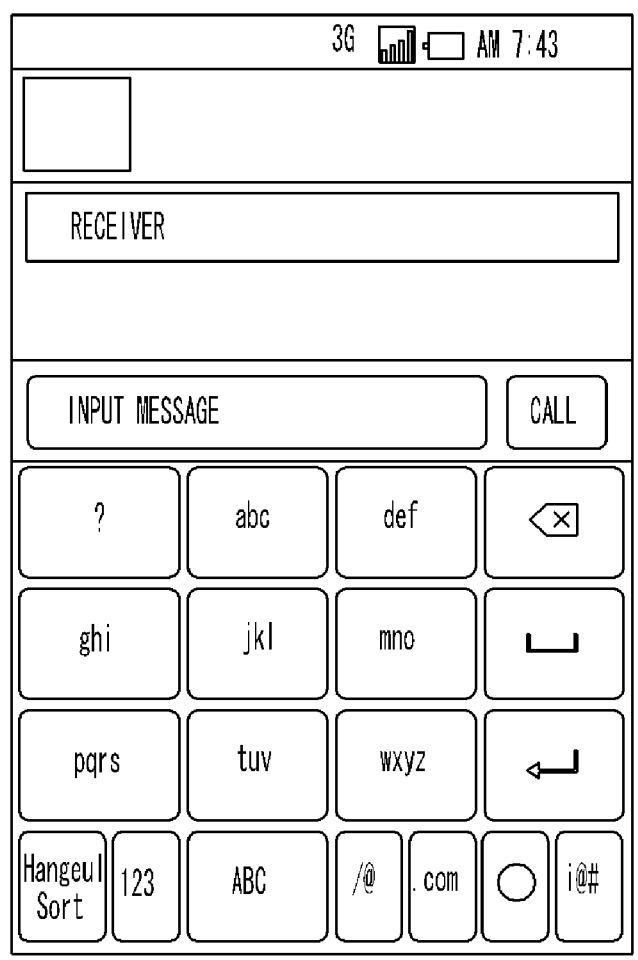
FIG. 3A to 3D illustrate various types of virtual key input units.
Figure 3B:
Figure 3C:
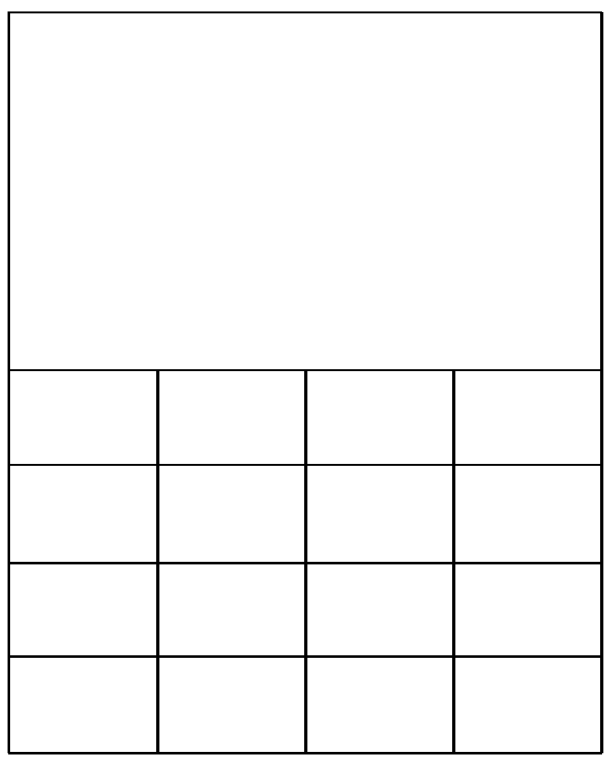
Figure 3D:
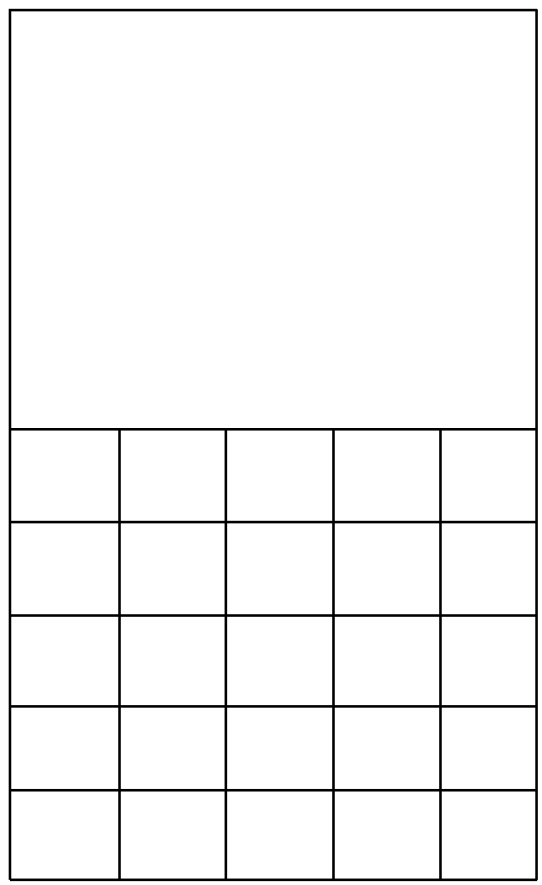

FIGS. 3A to 3D illustrate various types of virtual key input units. FIG. 3A illustrates a vertical virtual key pad, FIG. 3B illustrates a horizontal virtual full key pad, FIG. 3C illustrates a 4×4 virtual key pad, and FIG. 3D illustrates a 5×5 virtual key pad. Meanwhile, the virtual key input unit may be provided in a type which is not illustrated in FIGS. 3A to 3D.

Figure 4A:
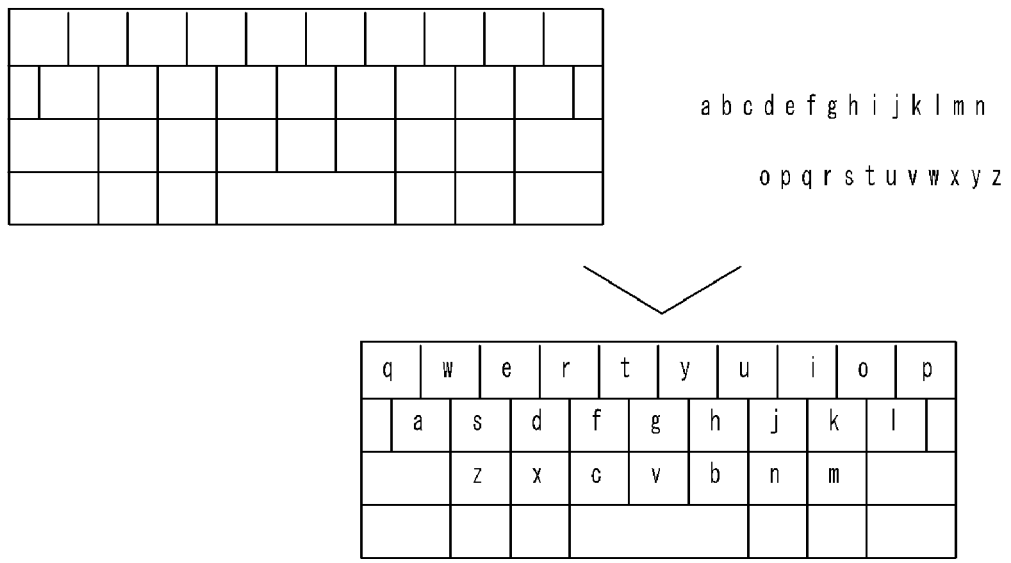
FIGS. 4A and 4B illustrate a process of generating a transparent skin input unit.
Figure 4B:
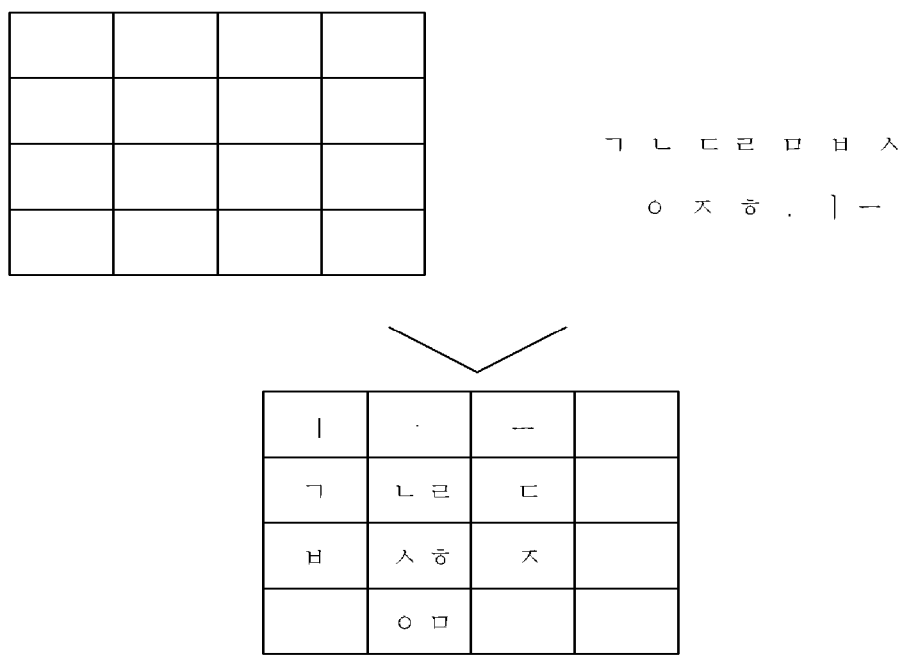

FIGS. 4A and 4B illustrate a process of generating a transparent skin input unit based on the virtual key input unit selected through the process of FIG. 2. The transparent skin input unit generator 22 generates a Qwerty keyboard-type transparent skin input unit 23 as illustrated in FIG. 4A or a 4\*4 keypad-type transparent skin input unit 23 as illustrated in FIG. 4B. The transparent skin input unit 23 is constructed in a 2D arrangement. That is, the transparent skin input unit 23 includes graphic data which clearly represent boundaries for dividing character keys and function keys and clarify the other regions.

More specifically, the size of the virtual key input unit is set to 'horizontal pixel number*vertical pixel number', and the virtual key input unit is generated as 2D graphic data. The generated 2D graphic data are processed by the unit of key arrangement, and lines are drawn according to the shape of the virtual key input unit. Subsequently, graphic processing is performed to insert characters or symbols of function keys into the respective key arrangements, and the other regions of the virtual key input unit excluding the boundary lines between the respective keys, the characters, and the symbols are clarified. Then, the transparent skin input unit 23 of the virtual key input unit is generated. In other words, the transparent skin input unit 23 is generated by computer graphic processing which may obtain an effect of printing key boundary lines and characters on a transparent glass panel.

Figure 5:
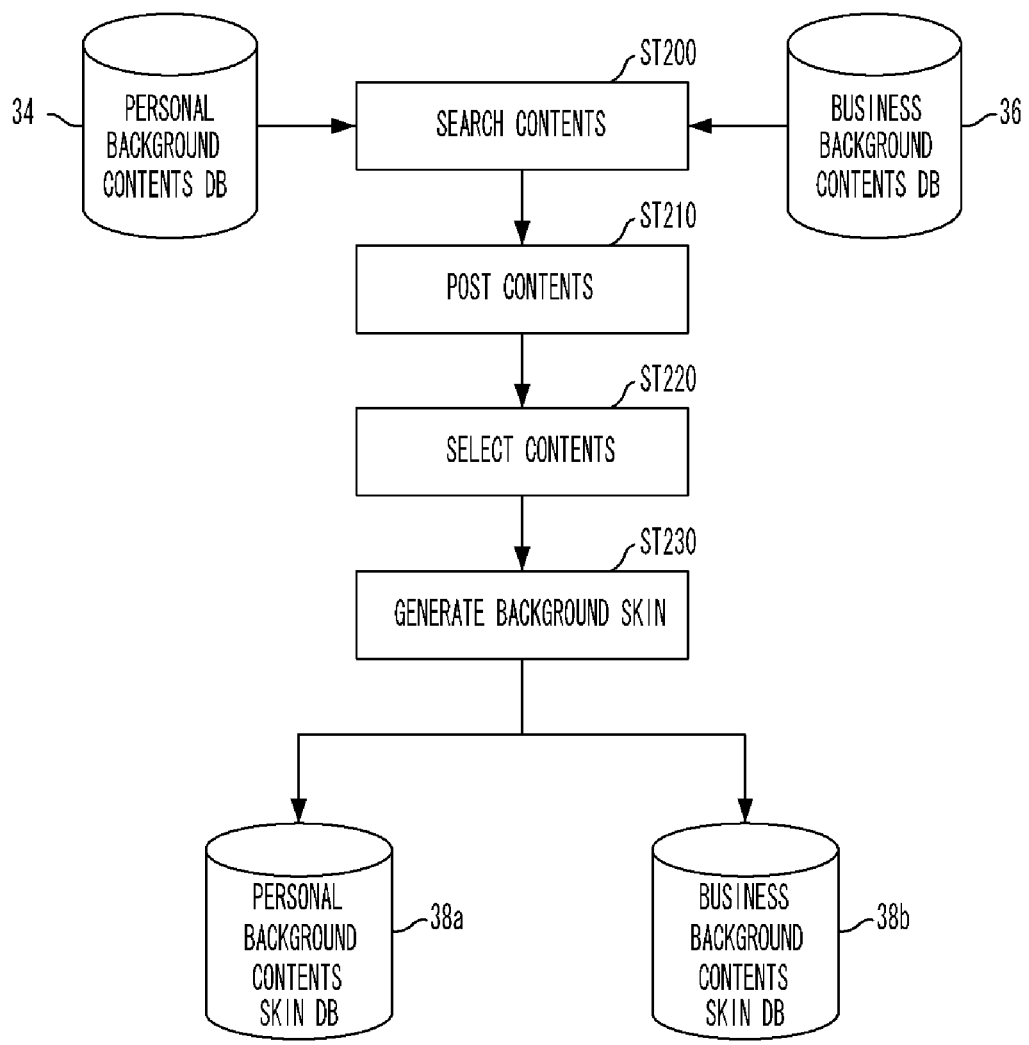
FIG. 5 shows a process of generating a background skin.

FIG. 5 shows a process of generating a background skin from background contents. Referring to FIG. 5, the process is started by searching background contents at step ST200. At this time, the personal background contents DB 34 or the business background contents DB 36 is referred to by a user's selection or a preset method. After the searching of the background contents, the searched contents are posted on a display screen of the smart phone 10 at step ST210. When the background contents are searched, attributes of the respective contents, such as contents name, producer, and provider, may be used. The user selects background contents at step ST220. Then, the background skin generator 32 generates a background skin 33 using the selected background contents at step ST230.

The background skin generator 32 adjusts the selected contents according to the physical characteristics of the user's information communication terminal, that is, the size and resolution of the virtual keypad, and generates the background skin 33. This process is carried out by a graphic software tool. The generated background skin 33 may be stored in and managed by the personal background skin DB 38a or the business background skin DB 38B, depending on the necessity and use. Through the above-described processes, the generation of the background skin is completed.

Figure 6:
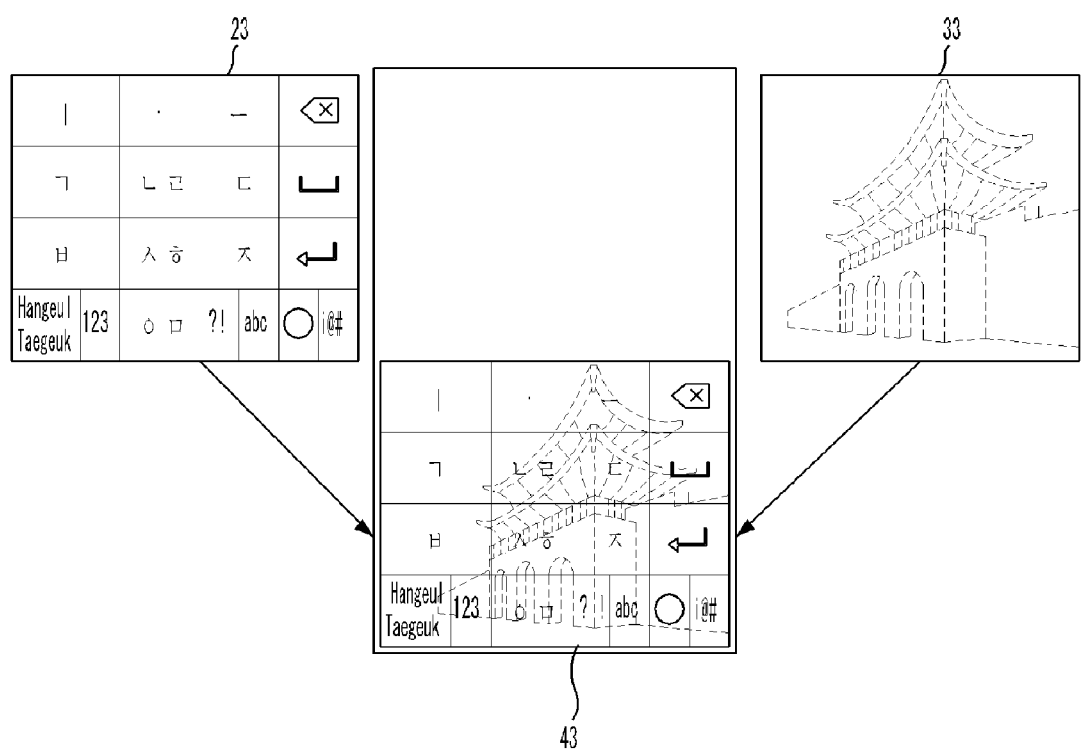
FIG. 6 shows a process of combining a transparent skin input unit and a background skin.

FIG. 6 shows a process of combining a transparent skin input unit and a background skin. Referring to FIG. 6, it can be seen that the transparent skin input unit 23 generated through the process of FIG. 2 and the background skin 33 generated through the process of FIG. 5 are combined to form a combined skin 43. When the combined skin 43 is formed in such a manner, the virtual key input unit according to the embodiment of the present invention is completely formed. The virtual key input unit is displayed on the lower region 12 of the smart phone 10 as illustrated in FIG. 1.

Figure 7:
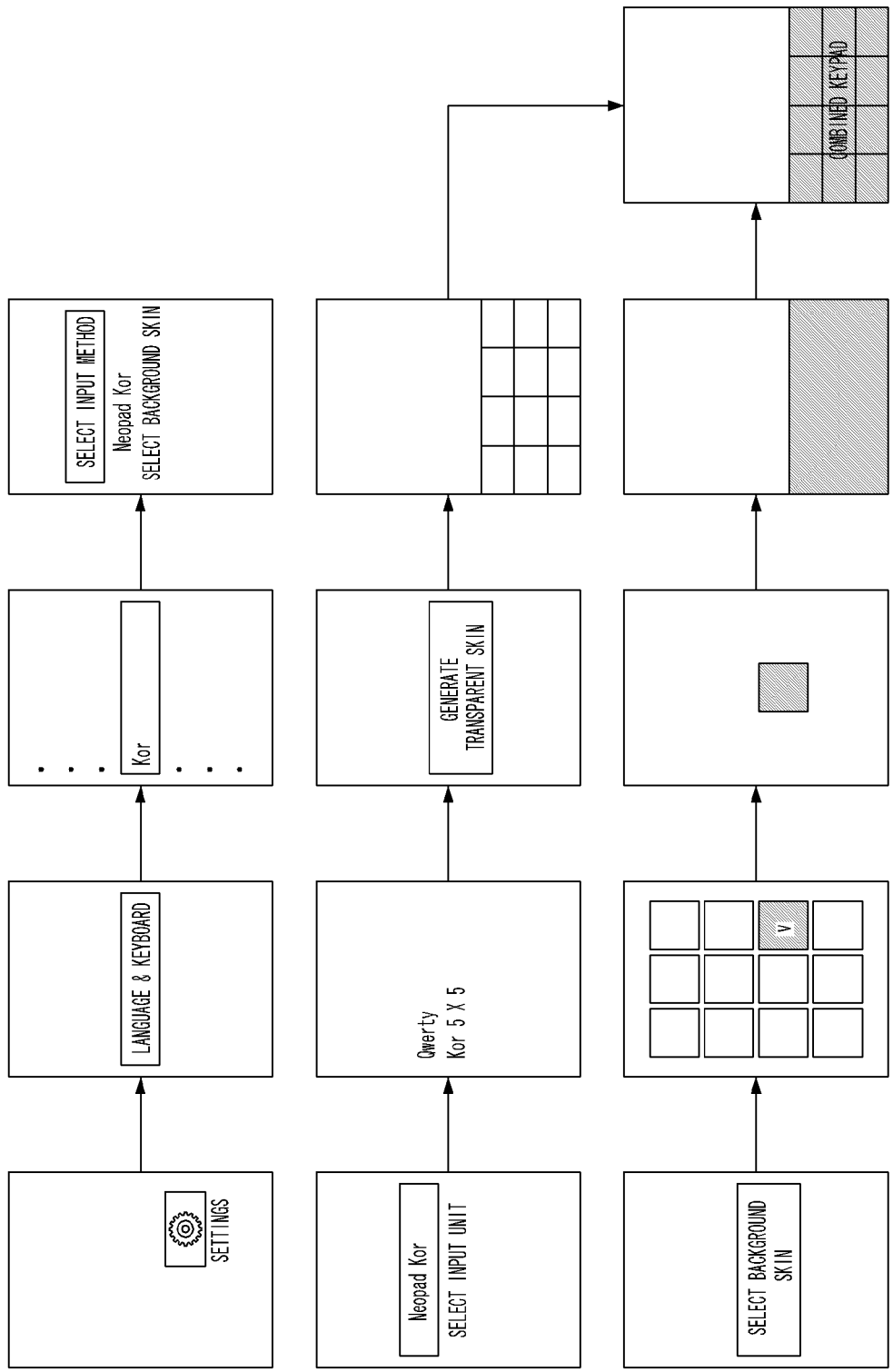
FIG. 7 illustrates an example in which a method for providing background contents of a virtual key input device according to the embodiment of the present invention is performed in an Android-based smart phone.

FIG. 7 obviously illustrates an example in which a method for providing background contents of a virtual key input device according to the embodiment of the present invention is performed in an Android-based smart phone. Referring to FIG. 7, a user touches 'Settings' widget provided by the smart phone 10 to activate a language and keyboard selection window. Then, the user selects 'Kor' representing Korean from the selection window. When the user selects 'Neopad Kor' from an input method selection window, an input unit selection process is started as illustrated in a second line of FIG. 7. During the input unit selection process, when the user selects a Qwerty and 5*5 Korean keypad, the transparent skin input unit generator 22 loads a 2D transparent skin input unit 23 on the screen.

Meanwhile, when the user selects 'Select Background Skin' from the input method selection window, a background skin selection process is started as illustrated in a third line of FIG. 7. First, the user selects background contents at a background contents selection step. Then, the background skin generator 32 generates a background skin 33 which is fitted into the area for displaying the transparent skin input unit 23, based on the selected background contents, and loads the background skin 33.

Next, the skin combiner 42 combines the transparent skin input unit 23 and the background skin 33 and generates a combined skin 43. The combined skin 43 is displayed as the virtual key input unit on the screen.

Figure 8A:
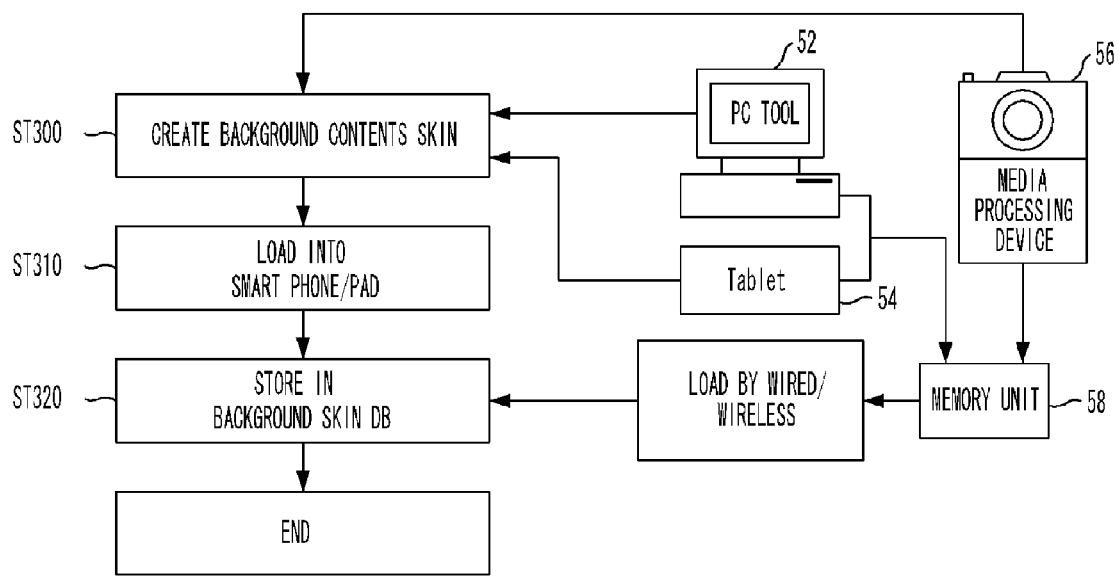
FIGS. 8A and 8B show a process of generating a background skin.
Figure 8B:
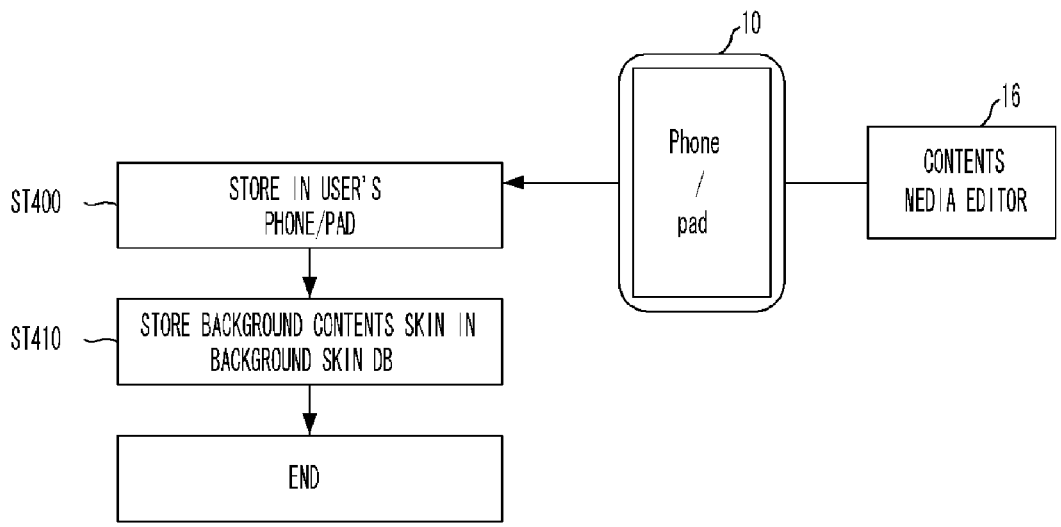

FIG. 8A shows a process of generating a background skin in an external PC, and FIG. 8B shows a process of generating a background skin in a smart phone or pad-type PC. Referring to FIG. 8A, a desktop PC 52 or a mobile PC such as a tablet 54 may provide background contents or generate background contents. Furthermore, a user may use a digital camera 56 to create background contents. An image taken by the digital camera 56 may be transmitted to the PC 52 or stored in a memory unit 58 of the digital camera 56 and then transmitted to the user's smart phone where a virtual key input unit is implemented. Furthermore, background contents stored in the PC 52 or the tablet 54 may be loaded through direct wired/wireless communication with the user's smart phone 10, or may be loaded through the memory unit 58. For example, an image taken by the digital camera 56 is stored in the PC 52. Furthermore, the user selects any one of taken images as background contents and generates a background skin 33 on the PC 52 at step ST300. Furthermore, a USB communication or the memory unit 58 is used to load the generated background skin 33 into the smart phone 10 or the pad at step ST310. The background skin 33 loaded in the smart phone 10 is stored in the background skin DB 38 at step ST320. As such, the background skin 33 may be generated by the external PC 52.

FIG. 8B shows an example in which a user creates a background skin 33 in the user's smart phone 10. The user edits images taken by a camera mounted in the smart phone 10 or images downloaded from outside, using a contents media editor 16. At this time, typically known graphic softwares may be used. The user edits the sizes and resolutions of background contents using the contents media editor 16, generates a background skin 33, and then stores the generated background skin 33 in the smart phone 10, at step ST400. Then, the background skin generator 32 stores the background skin 33 in the background skin DB 38, at step ST410.

Figure 9:
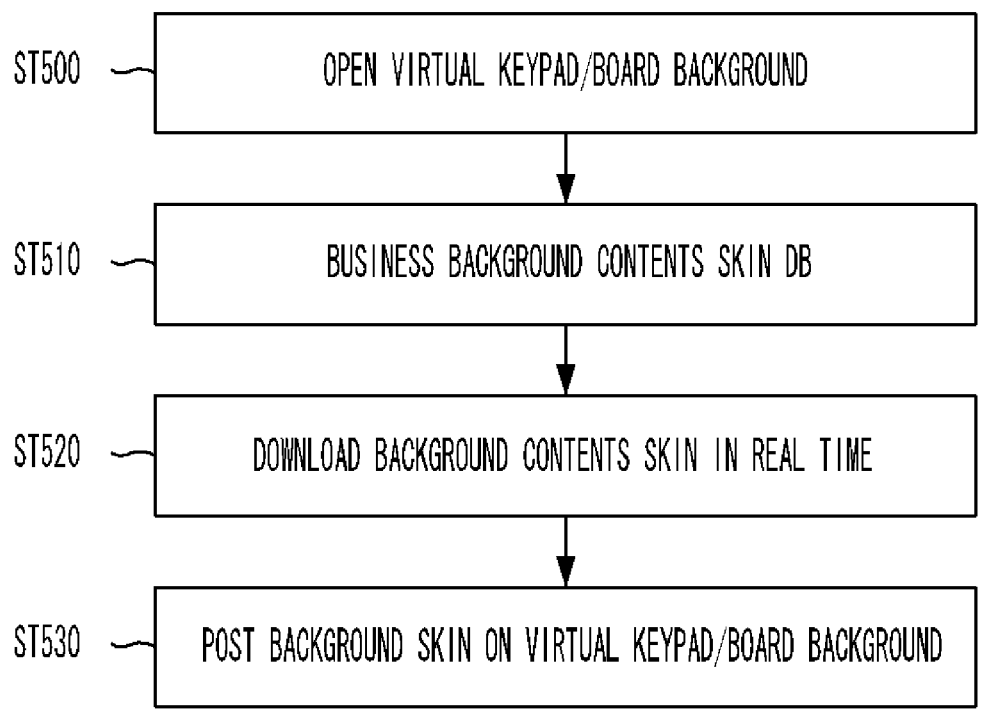
FIG. 9 shows a process of providing business background contents in real time.

FIG. 9 shows a process in which a service provider who provides a service such as advertisement, E-learning, or PR provides business background contents to the user's smart phone in real time. First, the process is started by opening a virtual keypad or keyboard background image of the user's smart phone 10 at step ST500. For example, when the user activates a virtual key input unit, an information communication terminal such as the user's smart phone 10 is opened to download a background skin.

Then, a business background contents DB server of the service provider is connected to the user's smart phone 10 at step ST510, and a predetermined background skin is downloaded into the user's smart phone 10 in real time at step ST520. The background skin 33 is posted on the user's smart phone 10 at step ST530. For example, the downloaded background skin 33 is overlapped and displayed on the transparent skin input unit 23 serving as a virtual key input device.

As the business background contents are provided in such a manner, the background space of the virtual key input device may be used as a place for providing various service contents such as an advertisement. Therefore, it is possible to provide a UX-based business model through an interactive action with a user. For example, when the user reads business background contents, a benefit such as a discount coupon or price discount may be offered.

That is, it is possible to implement a business model which collects business background contents provided from service providers to provide an advertisement, PR, or E-learning service, and offers a benefit to users who provide an unused space as a place for an advertisement or the like.

Figure 10:
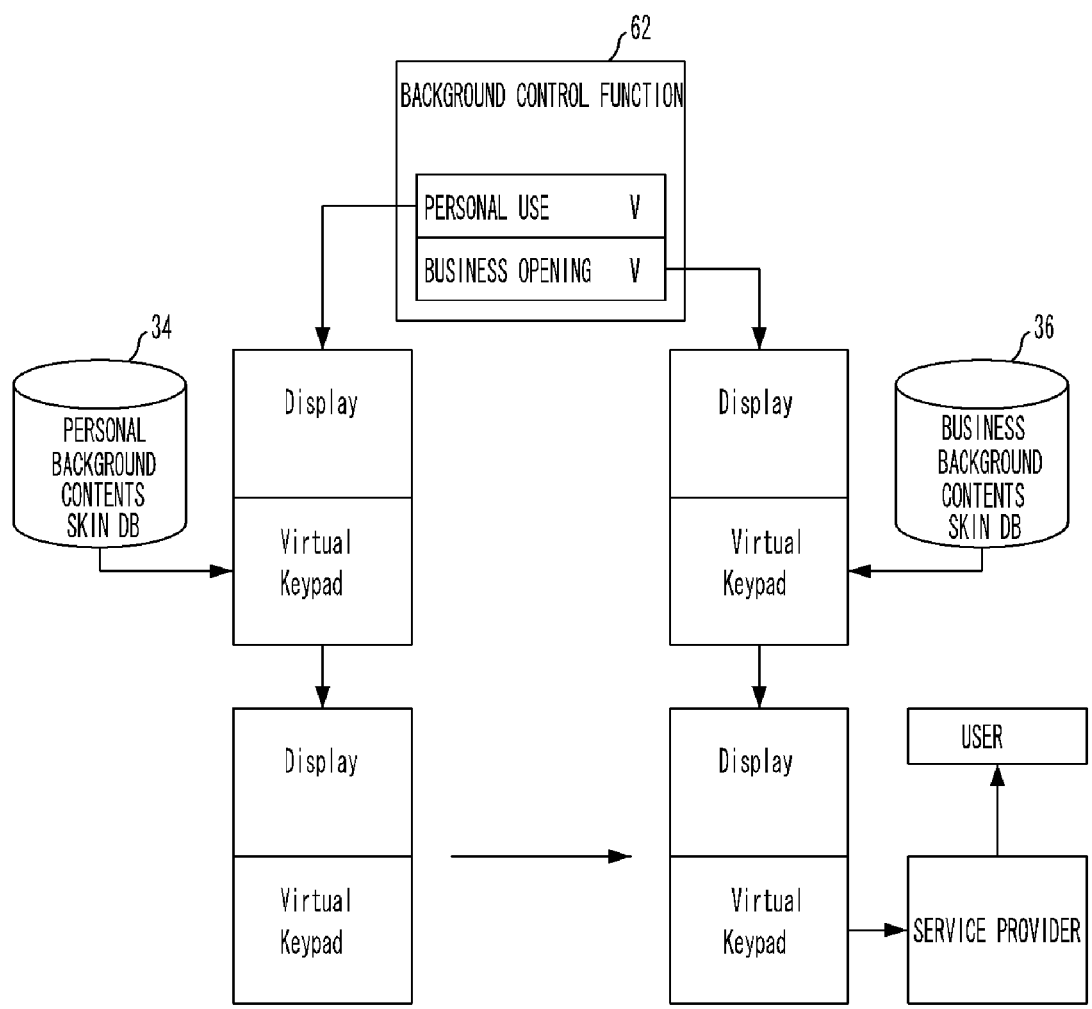
FIG. 10 shows an example in which a user selects whether to use personal background contents or use business background contents.

FIG. 10 shows an example in which a user selects whether to use personal background contents or use business background contents. For this example, the system for providing background contents of a virtual key input device may further include a background control unit 62 as illustrated in FIG. 10.

Referring to FIG. 10, the user activates the background control unit 62 in 'Settings' of the smart phone, and then checks any one of 'Personal Use' and 'Business Opening' from background control function items. In the case of 'Personal Use', background contents created or selected by the user may be provided as a background skin 33. In the case of 'Business Opening', the background space of the virtual key input device of the user is opened to external business background contents.

When both of 'Personal Use' and 'Business Opening' are checked as illustrated in FIG. 10, the background skin 33 provided from the personal background contents DB 34 is provided as a background image of the virtual key input device at normal times. However, when the background space is opened according to a request of a service provider, a business background skin provided from the remote business background contents DB 36 is posted as a background image of the virtual key input device. The user may receive a specific service such as a discount coupon or price discount, according to the time or number exposed to 'Business Opening'.

Figures 11, 12A:
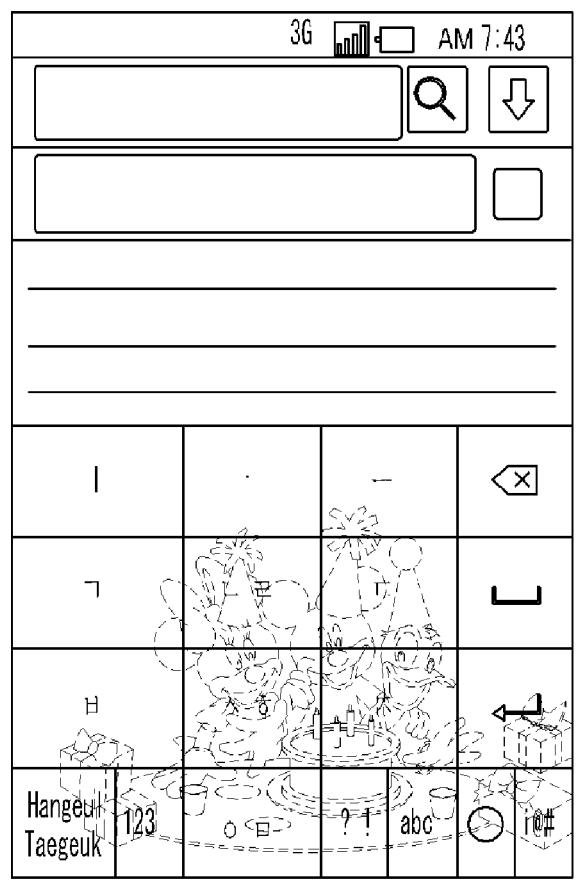
FIG. 11 shows attributes of a background contents DB according to the embodiment of the present invention.
FIGS. 12A to 12D show examples in which business background contents are utilized as background skins.

FIG. 11 shows attributes of the background contents DB according to the embodiment of the present invention. The personal or business background contents DB stores attributes such as unique number, name, production date, producer, resolution, and size of contents for each record. The attributes are used for storing, managing, and searching contents.

Figure 12B:
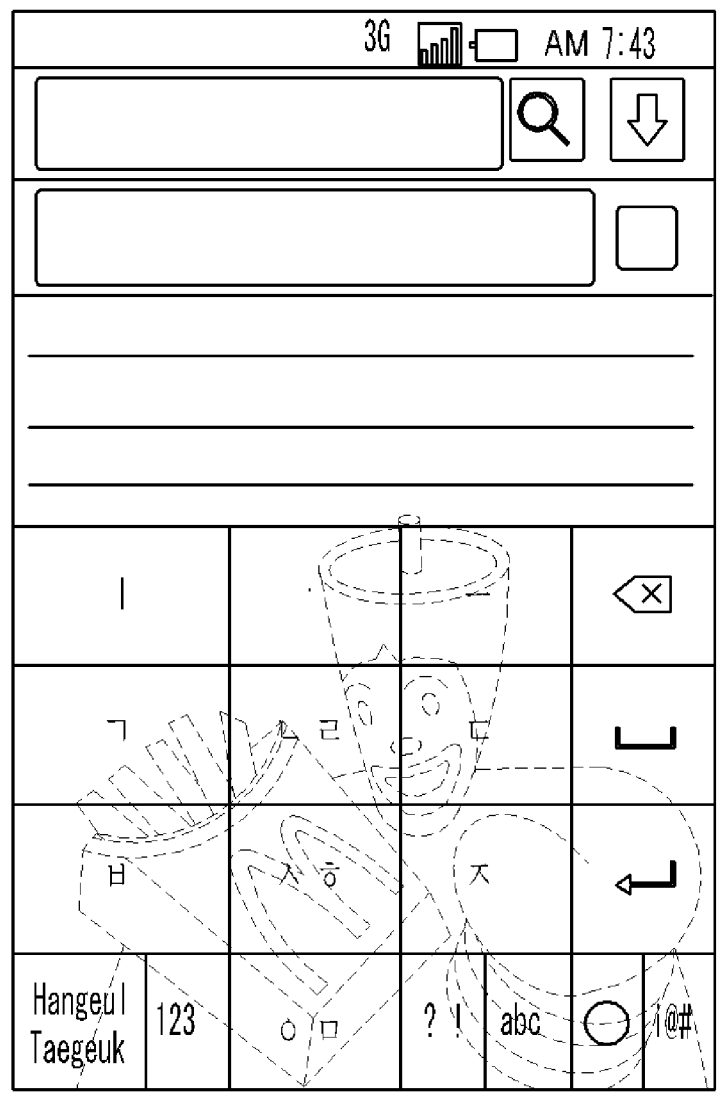
Figure 12C:
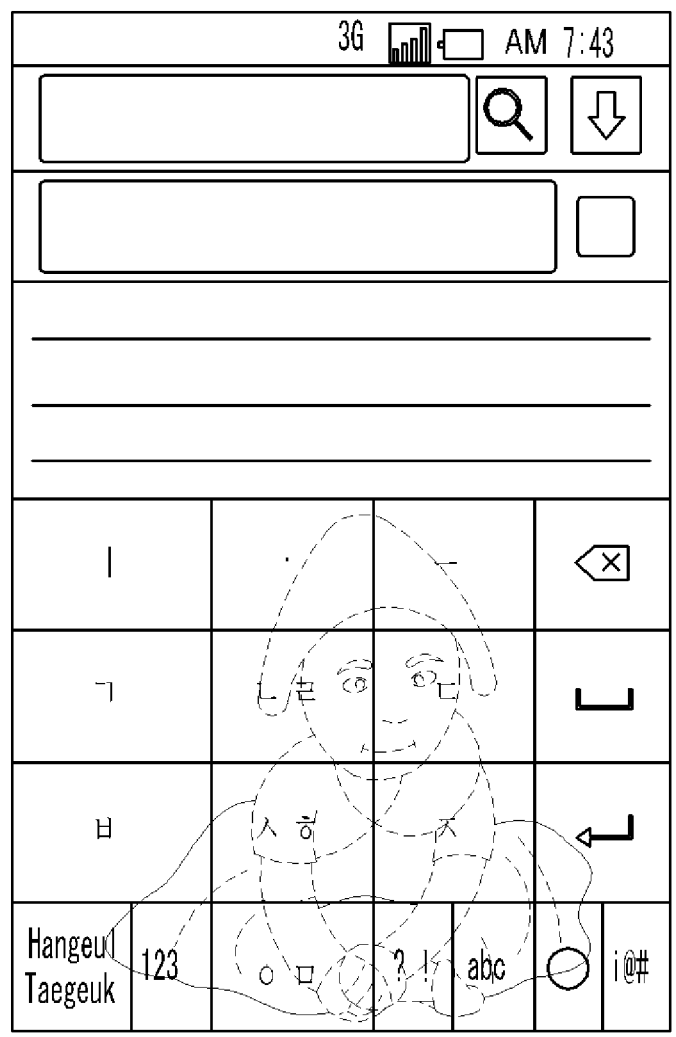
Figure 12D:
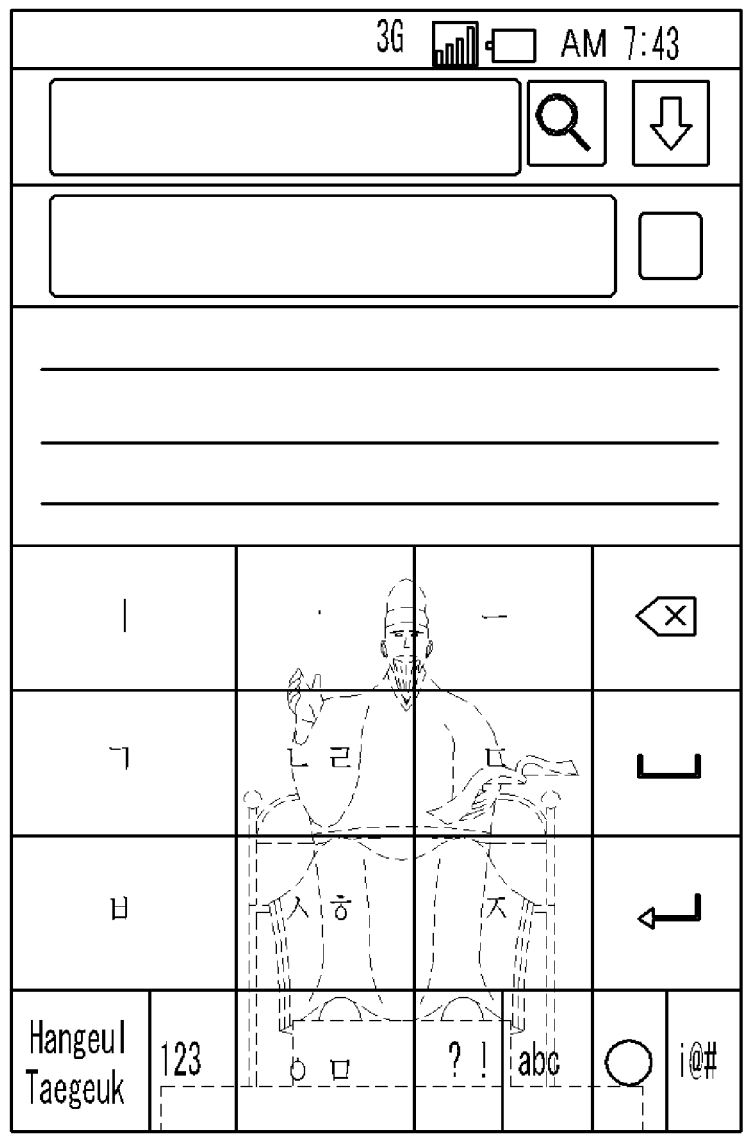

FIGS. 12A to 12D show examples in which business background contents are utilized as background skins. FIG. 12A shows an example in which business background contents are utilized for PR of a character business, FIG. 12B shows an example in which business background contents are utilized for PR of a conglomerate, FIG. 12C shows an example in which business background contents are utilized for PR of a personal business, and FIG. 12D shows an example in which business background contents are utilized for E-learning or the like. As the background space of the virtual key input device, which is an unused space, is utilized for various businesses, the TUI based on the latest UI technology and the UX technology aimed for realizing users' latent demands may be merged, and the space utilization may be increased to create a new business model.

While the present invention has been described with respect to the specific embodiments, it will be apparent to those skilled in the art that various changes and modifications may be made without departing from the spirit and scope of the invention as defined in the following claims.

The invention claimed is:

1. A method for providing contents to a user by using background contents of a virtual key input device on a display screen of an information communication terminal including a hardware processor, the method comprised of ordered steps executed by the processor via user input, configured to:

access a menu of a user interface of the information communication terminal;

select a virtual key input unit from a list of virtual key input units within the user interface of the information communication terminal, wherein a language for the virtual key input unit is selected from a plurality of languages, a key input method of a character layout is selected from a plurality of key input methods for the virtual key input unit, and a dimensional layout shape and arrangement structure of the virtual key input unit is selected from a plurality of dimensional layout shape and arrangement structures, such that each of the virtual key input units corresponding to a different type of a keypad;

generate a transparent skin key input unit having boundary lines for dividing character and function keys in the transparent skin key input unit based on the selected virtual key input unit;

respond to the user's selection of the background contents for the selected virtual key input unit on the display screen, by selecting within the user interface background contents for the selected virtual key input unit from a background contents database which stores background contents for the virtual key input units, selecting the background contents database within the user interface which includes selection of one of a contents database of background contents for personal use and a contents database of background contents for business use, and selecting within the user interface a background skin of the selected virtual key input unit based on the selected background contents according to the dimensional layout shape and arrangement structure of the selected virtual key input unit;

combine the generated background skin and the generated transparent skin key input unit; and generate a combined skin of the background skin and the transparent skin key input unit and displaying by the processor, the combined skin on the display screen of the information communication terminal.

2. The method according to claim 1, further comprising:

processing background contents using a media processor of the information communication terminal;

generating a background skin for the processed background contents; and storing the generated background skin in a background skin database.

3. The method according to claim 1, wherein the background contents for personal use comprises photographs, pictures, or animations.

4. The method according to claim 1, wherein the selecting the background contents comprises selecting the background contents from the contents database of background contents for business use and, wherein the method further comprises storing the background skin of the selected background contents in a business background skin database for the background contents for business use.

5. The method according to claim 4, wherein the background contents for business use comprises advertisement, education, or PR contents which are represented as multimedia contents including photographs, pictures, or animations.

6. The method according to claim 1, wherein each of the contents database of the background contents for personal use and the contents database of the background contents for business use contains, for each record, attributes including a name, a production date, resolution, and a size of the contents of the record.

7. The method according to claim 1, further comprising controlling, by the user, a use environment of the virtual key input unit of the user.

8. The method according to claim 7, wherein the controlling of the use environment of the virtual key input unit comprises selecting, by the user, whether to utilize the virtual key input unit for personal use or to open the virtual key input unit for business use.

9. The method according to claim 1, wherein the selecting the background contents and the generating the background skin comprises:
    searching the background contents from the background contents database;
    displaying the searched background contents on the display screen of the information communication terminal and selecting the background content for the virtual key input unit; and
    generating the background skin of the virtual key input unit using the selected background contents according to physical characteristics of the information communication terminal.

10. The method according to claim 9, wherein the generating the background skin according to the physical characteristics includes:
    standardizing the background contents according to a size of the virtual key input unit; and
    adjusting a resolution of the background contents according to a display resolution of the information communication terminal.

11. The method of claim 1, wherein the combining the transparent skin key input unit and the background skin comprises:
    loading the background skin on an area of the display screen of the information communication terminal; and
    loading the transparent skin key input unit of the virtual key input unit on the area of the display screen of the information communication terminal.

12. A system for providing contents to a user by using background contents of a virtual key input device on a display screen of an information communication terminal including a hardware processor configured to access a menu of a user interface of the information communication terminal, the system comprising:
    a background contents database configured to store background contents for virtual key input units of the information communication terminal, wherein the background contents database comprises a personal background contents database configured to store personal background contents and a business background contents database configured to store business background contents;
    a transparent skin key input unit database configured to store transparent skin key input units of the virtual key input units of the information communication terminal;
    a transparent skin input unit generator controlled by the processor and configured to select a virtual key input unit from a list of the virtual key input units within the user interface of the information communication terminal, wherein a language for the virtual key input unit is selected from a plurality of languages, a key input method of a character layout is selected from a plurality of key input methods for the virtual key input unit, and a dimensional layout shape and arrangement structure of the virtual key input unit is selected from a plurality of dimensional layout shape and arrangement structures, such that each of the virtual key input units corresponding to a different type of a keypad, and to generate a transparent skin key input unit having boundary lines for dividing character and function keys in the transparent skin key input unit based on the selected virtual key input unit;
    a background skin generator controlled by the processor and configured to select within the user interface background contents for the selected virtual key input unit from the background contents database, and to select within the user interface a background skin of the selected virtual key input unit based on the selected background contents according to the dimensional layout shape and arrangement structure of the selected virtual key input unit in response to the user's selection of the background contents for the selected virtual key input unit on the display screen, wherein the processor is configured to select within the user interface one of the personal background contents database and a business background contents database; and
    a skin combiner controlled by the processor and configured to combine the generated transparent virtual key input unit and the generated background skin, to generate a combined skin of the transparent skin key input unit and the background skin, and to display the combined skin on the display screen of the information communication terminal.

13. The system according to claim 12, wherein the background skin generator standardizes the selected background contents according to a size of the virtual key input unit, and adjusts a resolution of the background contents according to a resolution of the information communication terminal.

14. The system according to claim 12, wherein each of the personal background contents and the business background contents comprises photographs, pictures, or animations.

15. The system of claim 12, wherein the skin combiner is further configured to load the background skin on an area of the display screen of the information communication terminal and to load the transparent skin input unit on the area of the display screen of the information communication terminal.

* * * * *